United States Patent
Michaelis

(10) Patent No.: US 8,976,675 B2
(45) Date of Patent: Mar. 10, 2015

(54) AUTOMATIC MODIFICATION OF VOIP PACKET RETRANSMISSION LEVEL BASED ON THE PSYCHO-ACOUSTIC VALUE OF THE PACKET

(75) Inventor: Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 543 days.

(21) Appl. No.: 13/036,903

(22) Filed: Feb. 28, 2011

(65) Prior Publication Data

US 2012/0218900 A1 Aug. 30, 2012

(51) Int. Cl.
*H04J 3/14* (2006.01)
*H04L 12/66* (2006.01)
*H04M 3/22* (2006.01)
*H04L 29/06* (2006.01)

(52) U.S. Cl.
CPC ............. *H04L 12/66* (2013.01); *H04M 3/2236* (2013.01); *H04L 65/1016* (2013.01); *H04L 65/80* (2013.01)
USPC .......................................................... 370/241

(58) Field of Classification Search
None
See application file for complete search history.

(56) References Cited

U.S. PATENT DOCUMENTS

| 7,359,979 B2 | 4/2008 | Gentle et al. |
| 7,711,554 B2 * | 5/2010 | Mori et al. ................... 704/211 |
| 2006/0271357 A1 * | 11/2006 | Wang et al. .................. 704/223 |
| 2010/0318349 A1 * | 12/2010 | Kovesi et al. ................ 704/207 |

OTHER PUBLICATIONS

U.S. Appl. No. 12/656,428, filed Sep. 23, 2009, Michaelis et al.

* cited by examiner

*Primary Examiner* — Kouroush Mohebbi
(74) *Attorney, Agent, or Firm* — Sheridan Ross P.C.

(57) ABSTRACT

An exemplary technique disclosed herein is that the transmitter of a VOIP stream can assess the psycho-acoustic importance of each packet, and then use a protocol that supports redundant transmission to retransmit only the packets that are judged to be important for voice quality and intelligibility. Illustratively, a packet containing a plosive might be retransmitted redundantly because of its disproportionate contribution to intelligibility, but a packet that occurs entirely within a long-duration fricative transmitted only once. An exemplary aspect may also support multiple levels of transmission redundancy based on multiple levels of packet importance, with the levels varying based on the relative psycho-acoustic importance of each packet and/or the degree of network congestion.

20 Claims, 3 Drawing Sheets

AUTOMATIC MODIFICATION OF VOIP PACKET RETRANSMISSION LEVEL BASED ON THE PSYCHO-ACOUSTIC VALUE OF THE PACKET

FIELD

An exemplary embodiment is directed toward communications. More specifically, an exemplary embodiment is directed toward packet retransmission based on detected characteristics of one or more packets.

BACKGROUND

Voice Over Internet Protocol (VOIP) refers to a communication service, such as that used for voice, fax, SMS, and/or voice-messaging applications, that is transported via the internet rather than the public-switched telephone network. The typical steps involved in originating a VOIP communication session are signaling and media channel setup, digitization of the analog voice signal, encoding, packetization and transmission of the voice signal as internet protocol (IP) packets over a packet-switched network. On the receiving side, similar steps, typically in the reverse order, such as reception of the IP packets, decoding of the packets, digital-to-analog conversion and reproduce the original information, such as a voice stream of a user, occur.

VOIP systems also usually employ session control protocols to control the setup and tear-down of calls as well as audio codecs which encode speech and allow transmission of the same over an IP network as digital audio via an encoded audio stream. The codec used is varied between different implementations of VOIP while some implementations rely on narrow-band and compressed speech and others support high fidelity stereo codecs.

VOIP has been implemented in numerous ways using both proprietary and open protocols and standards such as H.323, IP Multimedia Subsystem (IPMS), Media Gateway Control Protocol (MGCP), Session Initiation Protocol (SIP), Real-time Transport Protocol (RTP), Session Description Protocol (SDP), the Skype protocol, and the like.

Communication over an IP network can be less reliable in contrast to the traditional circuit-switched public telephone network, as the IP network does not typically provide a network-based mechanism to ensure the data packets are not lost, or that they are delivered in a sequential order. IP networks are typically a best-effort type of network without fundamental quality of service guarantees (QoS). Therefore, VOIP implementations may face problems mitigating latency, jitter, packet loss and packet reception order. By default, IP routers handle traffic on a first-come, first-served basis, with routers on high volume traffic links introducing latency that exceeds permissible thresholds for VOIP. Fixed delays can typically not be controlled as they are caused by the physical distance the packets travel, however, latency can be minimized by marking voice packets as being delay-sensitive with known techniques. A VOIP packet usually has to wait for the current packet to finish transmission, although it is possible to preempt a less important packet in mid-transmission, although this is not commonly done, especially on high-speed links where transmission times are short, even for maximum-sized packets.

A number of protocols have been defined to support the reporting of QoS/QOE (Quality of Experience) for VOIP calls. There are also layer-two quality of service metrics that focus on quality of service issues at the data link layer and physical layer that can be used to ensure that applications such as VOIP work well even in congested network environments.

As discussed, VoIP is the descriptor for the technology used to carry digitized voice over an IP data network. VoIP typically requires two classes of protocols: a signaling protocol such as SIP, H.323 or MGCP that is used to setup, disconnect and control the calls and telephony features; and a protocol to carry speech packets. For example, the Real-Time Transport Protocol (RTP) carries speech transmission. RTP is an IETF standard introduced in 1995 when H.323 was standardized. RTP will work with any signaling protocol and is the commonly used protocol among IP PBX vendors. Most IP phones or softphones generate a voice packet every 10, 20, 30 or 40 ms, depending on the vendor's implementation. The 10 to 40 ms of digitized speech can be uncompressed, compressed and/or optionally encrypted with many packets utilized to carry one word.

The voice codecs encode the voice data in the packet structures for transmission over the data network and can compare the acoustic information (each frame of which includes spectral information such as sound or audio amplitude as a function of frequency) in temporally adjacent packet structures and assign to each packet an indicator of the difference between the acoustic information in adjacent packet structures. The voice codec typically includes, in memory, numerous voice codecs capable of different compression ratios. Some typical codecs include G.711, G.723.1, G.726, G.728, and G.729, however it is to be understood that any voice codec whether known currently or developed in the future could be in memory. Voice codecs encode and/or compress the voice data in the packet structures. For example, a compression of 8:1 is achievable with the G.729 voice codec (thus the normal 64 Kbps PCM signal is transmitted in only 8 Kbps). The encoding functions of codecs are further described in Michaelis, *Speech Digitization and Compression*, by Michaelis, P. R., available in the International Encyclopedia of Ergonomics and Human Factors, pp. 683-685, W. Warkowski (Ed.), London: Taylor and Francis, 2001; ITU-T Recommendation G. 729 General Aspects of Digital Transmission Systems, Coding of Speech at 8 kbit/s using Conjugate-Structure Algebraic-Code-Excited Linear-Prediction, March 1996; and Mahfuz, Packet Loss Concealment for Voice Transmission Over IP Networks, September 2001, each of which is incorporated herein by reference.

There are also many techniques available for the digitization and creation of the packets. For a general discussion of the operation of vocal tract models, see *Speech Digitization and Compression*. In general, these techniques use mathematical models of the human speech production mechanism. Accordingly, many of the variables in the models actually correspond to the different physical structures within the human vocal tract that vary while a person is speaking. In a typical implementation, the encoding mechanism breaks voice streams into individual short duration frames. The audio content of these frames is analyzed to extract parameters that "control" components of the vocal tract model. The individual variables that are determined by this process include the overall amplitude of the frame and its fundamental pitch. The overall amplitude and fundamental pitch are the components of the model that have the greatest influence on the tonal contours of speech, and are extracted separately from the parameters that govern the spectral filtering, which is what makes the speech understandable and the speaker identifiable. Tone contour transformation may therefore be performed by applying the appropriate delta to the original amplitude and pitch parameters detected in the speech.

Because changes are made to the amplitude and pitch parameters, but not to the spectral filtering parameters, the transformed voice stream will still generally be recognizable as being the original speaker's voice. The transformed speech may then be sent to the recipient address, stored, broadcast or otherwise released to the listener. For example, where the speech is received in connection with leaving a voice mail message for the recipient, sending the transformed speech may comprise releasing the transformed speech to the recipient address.

SUMMARY

Despite the above techniques, packet loss in a VOIP environment occurs which the above techniques cannot address. This packet loss in VOIP systems can decrease the perceived quality and intelligibility of the speech. As discussed, one way to reduce the packet loss rate in VOIP systems is to utilize a quality of service (QOS) metric that assigns a higher priority to VOIP packets than are assigned to, for example, data packets. This does not work well however when a large portion of the traffic is designated as "high-priority."

One way to reduce the effects of packet loss is to transmit the packets redundantly. A commonly used technique relies on packet encapsulation of the sort specified by RFC-2198 "RTP payload for redundant audio data," which is incorporated herein by reference in its entirety. However, one problem with this approach is that it uses a tremendous amount of bandwidth, hardly what one would want to do on a network that is already experiencing packet loss due to congestion. As an example, a G.711-encoded transmission, with just two levels of redundancy, requires approximately 200 KBPS.

A method and technique is required that would be reliable on networks that have a high proportion of "high priority" transmissions without the bandwidth penalty associated with traditional RFC-2198.

Quoting from the IETF FRC-2198 specification, "While the addition of redundancy to an audio stream is an effective means by which that stream may be protected against packet loss, application designers should be aware that the addition of larger amounts of redundancy will increase network congestion and, hence packet loss, leading to a worsening of the problem for which the use of redundancy was intended to solve. At its worst, this can lead to excessive network congestion and may constitute a denial of service attack."

One exemplary concept underlying a technique disclosed herein is that not all audio packets contribute equally to the perceived quality and intelligibility of speech. For example, keeping in mind that the duration of a plosive sound, e.g., the "T" in tall, the "B" in ball, the "P" in Paul, is only about 5 mS, it is clear that the loss of just one packet that contains a plosive sound could have a significant impact on intelligibility—In this case, making it impossible to distinguish between Tall, Ball and Paul. A plosive sound, also known as a stop or occlusive, is a consonant sound produced by stopping the air flow in the vocal tract. The terms plosive and stop are usually used interchangeably but they are not necessarily perfect synonyms. Plosives are a subset of stops, oral stops with pulmonic egressive air stream mechanism. That is, air flow is released outwards through the mouth. This contrasts with implosive consonants where air flow is brought in. In general, plosives cut-off the breath stream so that what immediately perceives the plosive is silence, with plosives having a "pop."

By contrast, the loss of a packet within a long-duration speech event, such as a vowel sound or a fricative, often has little or no effect on intelligibility. In part, this is true because of VOIP packet loss concealment algorithms, notably those that fill the gap by averaging the acoustic information contained within the adjacent packets that have not been received, can often do a fairly good job recreating the missing information. Quite obviously, an approach of this sort would however fail to rebuild a missing plosive.

U.S. Pat. No. 7,359,979, which is incorporated herein by reference, discloses a technique in which the psycho-acoustic importance of individual audio packets may be assessed. In its simplest form, the technique assigns a lower value to packets that are judged to be acoustically similar to adjacent packets. A higher value is assigned to packets that differ significantly from the adjacent packets. An even higher value is assigned to packets that contain significant within-packet variation.

An exemplary technique of an embodiment disclosed herein is that the transmitting component of a VOIP stream can use the technique disclosed in the above-referenced patent to assess the psycho-acoustic importance of each packet, and then use a variant of RFC 2198 (or other protocol that supports redundant transmission) to retransmit only the packets that are judged to be important for voice quality and intelligibility. Illustratively, a packet containing the plosive might be retransmitted redundantly, but a packet that occurs within a fricative only once not re-transmitted.

An exemplary embodiment may also support multiple levels of transmission redundancy, with the levels varying based on the relative psycho-acoustic importance of each packet and/or the degree of network congestion.

By limiting the redundant transmission of audio packets to those that are essential for voice quality and intelligibility, one exemplary solution can be expected to provide better results than previous solutions on congested networks in which a large proportion of the transmissions are "high priority." For example, a transmitter-side of a communication system can be modified such that it only repeats important packets but does not repeat unimportant packets. For example, rather than provide the same degree of redundant transmission for all VOIP packets in a specific stream, redundant transmission is only provided for the audio packets that contribute disproportionately to voice quality and intelligibility. These packets that contribute disproportionately to voice quality and intelligibility can be determined based on one or more of a delta in energy between one or more adjacent packets, the detection of a plosive sound, analysis of the acoustic properties of a packet, and/or recognition of known speech patterns.

Complicating this process is that typically these packets that contribute disproportionately to voice quality and intelligibility are short-duration events. For example, the duration of a key event may be shorter than the length of the packet. In typical VOIP packet-based systems, a packet is usually equivalent to about 20 milliseconds of speech. In contrast, some plosives are only 5 milliseconds in length. Accordingly, an exemplary embodiment of this system is able to distinguish whether a packet contributes disproportionately to voice quality and intelligibility regardless of whether the "key event" lasts only for a portion of the packet length, for the entire packet length, or continues over a plurality of packets.

Accordingly, an exemplary embodiment is directed toward redundant packet communication.

An exemplary embodiment is further directed toward redundant packet transmission.

An exemplary embodiment is further directed toward redundant packet reception.

A further aspect is directed toward identifying one or more packets that contribute disproportionately to voice quality and intelligibility.

Additional aspects relate to flagging or otherwise identifying one or more packets that contribute disproportionately to voice quality and intelligibility.

Aspects also relate to managing and special handling of one or more packets that contribute disproportionately to voice quality and intelligibility.

An even further aspect is directed toward retransmitting packets that were identified as contributing disproportionately to voice quality and intelligibility.

Even further aspects are directed toward redundant communication of packets that were identified as contributing disproportionately to voice quality and intelligibility.

Even further aspects are directed toward buffering packet(s) that were identified as contributing disproportionately to voice quality and intelligibility.

Additional aspects are directed toward identifying packets that were identified as contributing disproportionately to voice quality and intelligibility based on one or more of a change in energy, detection of a plosive and/or analysis of acoustic properties associated with one or more packets.

Another exemplary aspect is directed toward having gradations of psycho-acoustic importance. The use of gradations, instead of a simple binary yes or no for retransmission of a packet, is valuable because it would allow different levels of redundancy—e.g., very important packets could be sent three times, semi-important packets twice, and packets that one is willing to lose just once. For example, the system could determine the amount of energy delta, a first packet versus an adjacent packet(s) and then assign a gradation of psycho-acoustic importance. Another way would be the amount of within packet variation. (Packets that have no within-packet variation, and high similarity to the adjacent packets, would be rebuilt easily and accurately by common packet loss concealment algorithms.) Packets that have a high within-packet variation could be assigned an "important" identifier and packets that have a very high within pack variation assigned a "very important" identifier with a correspondingly very high redundancy.

The number of times a packet is retransmitted with a specific psycho-acoustic value doesn't always have to be the same. For example, the system might normally send a packet with a psycho-acoustic value of "X" twice. But if the network is congested (or for one or more other reasons), it might make sense to send that packet three or four times instead of two, in order to ensure that the packet is not lost.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any non-transitory, tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, this disclosure is considered to include a tangible storage medium or distribution medium and prior art-recognized equivalents and successor media, in which the software implementations of the present embodiments are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the embodiments are described in terms of exemplary embodiments, it should be appreciated that individual aspects of the embodiments can be separately claimed.

The preceding is a simplified summary of the embodiments to provide an understanding of some aspects of thereof. This summary is neither an extensive nor exhaustive overview of the various embodiments. It is intended neither to identify key or critical elements of the embodiments nor to delineate the scope of the embodiments but to present selected concepts of the embodiments in a simplified form as an introduction to the more detailed description presented below. As will be appreciated, other embodiments are possible utilizing, alone or in combination, one or more of the features set forth above or described in detail below.

BRIEF DESCRIPTION OF THE FIGURES

The exemplary embodiments will be described in relation to the following figures wherein.

DETAILED DESCRIPTION

The embodiments will be illustrated below in conjunction with an exemplary communication system. Although well suited for use with a system using a computer/electronic device, server(s), communications devices, and/or database (s), the embodiments are not limited to use with any particular type of electronic device(s) or system or configuration of system elements. Those skilled in the art will recognize that the disclosed techniques may be used in any communication environment in which it is desirable to reduce the effects of packet loss on perceived voice quality. For example, the techniques disclosed herein can also be used in a multi-party conference, a multimedia communication session, or the like.

The exemplary systems and methods will also be described in relation to software (such as drivers, codecs, etc.), modules, and associated hardware. However, to avoid unnecessarily obscuring the present disclosure, the following description omits well-known structures, components and devices that may be shown in block diagram form, are well known, or are otherwise summarized.

For purposes of explanation, numerous details are set forth in order to provide a thorough understanding of the embodiments. It should be appreciated, however, that the techniques disclosed herein may be practiced in a variety of ways beyond the specific details set forth herein.

Figure 1:
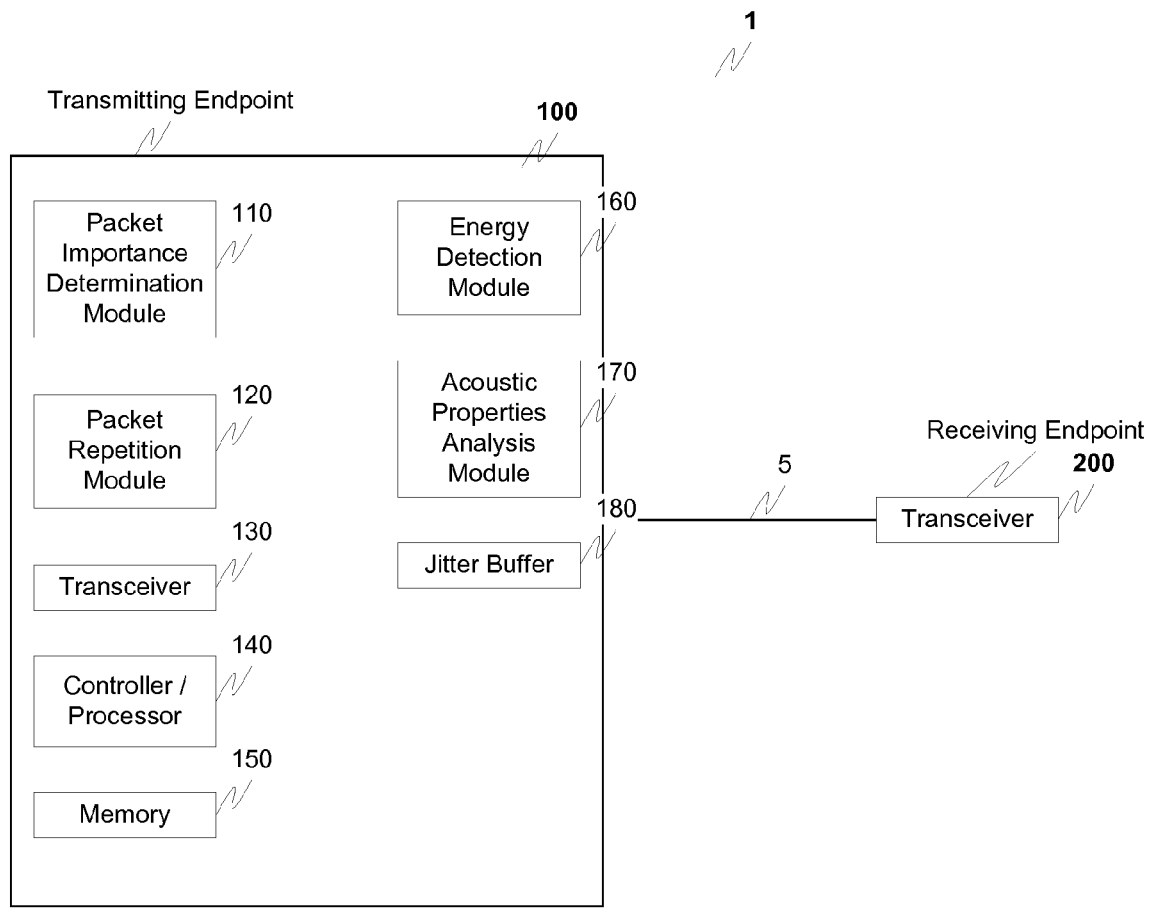
FIG. 1 illustrates an exemplary communication system according to an exemplary embodiment of this invention.

FIG. 1 illustrates an exemplary communication system one. In addition to well known componentry, the communications system 1 includes a transmitting endpoint 100 and a receiving endpoint 200, connected via a wired or wireless link 5, e.g., a communications channel. In addition to well known componentry, the transmitting endpoint 100 and receiving endpoint 200 include comparable features and module including a packet importance determination module 110, a packet repetition module 120, transceiver 130, controller/processor 140, memory 150, energy detection module 160, acoustic properties analysis module 170, and jitter buffer 180.

As it is well known, initialization of a communication session between the transmitting endpoint 100 and the receiving endpoint 200 will not be described in detail herein, however operation will be discussed in relation to determining the importance of a packet that contributes disproportionately to voice quality/intelligibility, and, should a packet be identified as one that may contribute disproportionately to voice quality/intelligibility, providing a degree of redundant transmission for that packet in a packet stream.

Even more particularly communication commences with the transceiver 130 communicating with a corresponding transceiver in the receiving endpoint 200. As discussed, and in general, if the system determines that a packet is an important packet, that packet can be retransmitted a plurality of times for redundancy, and help in ensuring that the receiving endpoint 200 is capable of more accurately reconstructing the transmitted voice stream.

In operation, voice information is transmitted from the transmitting endpoint 100 to the receiving endpoint 200, with the cooperation of transceiver 130, controller 140, memory 150 and optionally jitter buffer 180.

In accordance with one optional exemplary embodiment, the controller 140 can monitor voice information received from a user associated with the transmitting endpoint 100 and detect when voice information is being received. The detection of this voice information can be used to trigger the activation of the packet importance determination module 110 and packet repetition module 120. For example, and in the event there is no voice information being received by the transmitting endpoint 100 from a user, the packet repetition technology disclosed herein could optionally be temporarily disabled until voice information is detected. Alternatively, the packet importance determination module 110 and packet repetition module 120 can always be active within the transmitting endpoint 100 and continue with assessing packet content to determine whether or not a packet is an "important" packet.

In accordance with a first exemplary embodiment, the energy detection module 160, cooperating with the packet importance determination module 110, packet repetition module 120 and transceiver 130 cooperate to determine whether a packet is an important packet. More specifically, the energy detection module 160 receives a stream of packets corresponding to speech received from a user by the transmitting endpoint 100. The energy detection module 160 performs an analysis of one or more adjacent packets. This analysis searches for a delta in the energy level between the one or more adjacent packets, with a spike in the energy level generally being correlatable to a plosive-type sound. Should this increase in energy level between one or more adjacent packets, or relative to a threshold, be identified, the packet is identified, by the packet importance determination module 110 as an important packet, which will be repeated by the packet repetition module 120 as discussed in greater detail hereinafter.

The packet importance determination module 110 flags or otherwise associates an identifier with these packets that are identified as being important, with these important packets optionally being stored in the jitter buffer 180 for redundant transmission by the packet repetition module 120 cooperating with transceiver 130.

In accordance with another exemplary embodiment and utilizing, for example, the technology disclosed in U.S. Pat. No. 7,359,979, discussed above. The acoustic properties analysis module 170 implements a technique in which the psycho-acoustic importance of individual audio packets is assessed. The acoustic properties analysis module 170 assigns a lower value to packets that are judged to be acoustically similar to adjacent packets, and a higher value assigned to packets that differ significantly from the other adjacent packets. An even higher value can optionally be assigned to packets that contain significant within-packet variation. Provided and analyzed packet is assigned either a high value or an even higher value, the acoustic properties analysis module 170, cooperating with the packet importance determination module 110 flags this packet as being an important packet. These important packets, as discussed, will be retransmitted a number of times for redundancy.

For retransmission, the packet repetition module 120 cooperates with the transceiver 130 and one or more of the controller 140, memory 150 and jitter buffer 180. The packets that have been identified, flagged, or otherwise identified as being important, are retransmitted one or more times, with the number of times they are retransmitted being proportional to the ability of the receiving endpoint 200 to accurately reproduce the audio signal received by the transmitting endpoint 100 from the user(s). Clearly, the higher the number of times a particular packet is retransmitted will increase the reproduction accuracy at the receiving endpoint 200, with the trade-off being an increase in bandwidth requirements.

In accordance with another exemplary embodiment, the packet can be assigned one or more gradations that correspond to psycho-acoustic importance of the packet. The use of gradations, instead of a binary yes or no for retransmission of a packet, is valuable because it would allow different levels of redundancy—e.g., very important packets could be sent three times, semi-important packets twice, and packets that one is willing to lose just once. For example, the system could determine the amount of energy delta for a first packet versus an adjacent packet(s), and then assign a gradation of psycho-acoustic importance to the packet. The packet repetition module 120 would then determine the number of times the packet should be retransmitted (if any). Another way to determine and assign a gradation would be to determine the amount of within packet variation. (Packets that have no within-packet variation, and high similarity to the adjacent packets, would be rebuilt easily and accurately by common packet loss concealment algorithms.) Packets that have a high within-packet variation could be assigned an "important" identifier or gradation and packets that have a very high within pack variation assigned a "very important" identifier or gradation with a correspondingly very high redundancy by the packet repetition module 120.

The number of times a packet is retransmitted by the packet repetition module 120 with a specific psycho-acoustic value doesn't always have to be the same. For example, the system might normally send a packet with a psycho-acoustic value of "Y" twice. But if it is determined that the network is congested (or for one or more other reasons), the packet may be sent three or four times instead of two, in order to ensure that the packet is not lost.

At the receiving endpoint 200, the receiving endpoint 200 buffers, or otherwise stores, the received packets for reassembly of the voice stream. As an option, if two or more of the same packets are received, the redundant packet can be deleted prior to re-assembly of the transmitted packet stream. As an additional option, the information regarding whether or not the packet is an important packet can be preserved, and this information utilized to further assist the receiving endpoint 200 with the reproduction of the transmitted voice stream. For example, the indication that a packet is an important packet can be utilized to regulate one or more of performance of the digital-to-analog converter, control volume information, control any type of filtering operation, or in general be utilized to enhance the quality of the voice information contained within the important packet(s).

Figure 2:
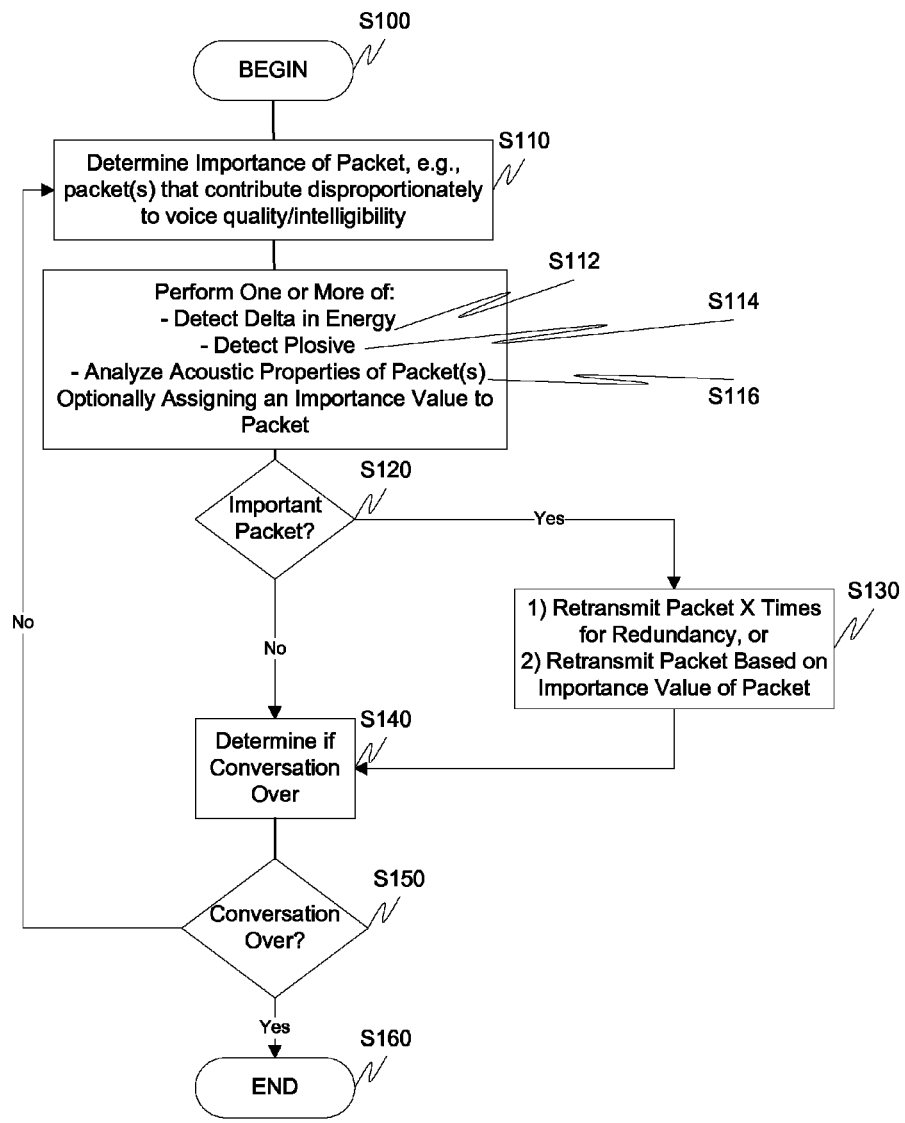
FIG. 2 is a flowchart illustrating an exemplary method for redundant packet transmission according to an exemplary embodiment of this invention.

FIG. 2 outlines an exemplary method of operation of a communication system according to an exemplary embodiment of this invention. In particularly, control begins in step S100 and continues to step S110. In step S110, the importance of a packet is determined. For example, packets that contribute disproportionately to voice quality and intelligibility are flagged, identified, or otherwise indicated as being an important packet. More specifically, any one or more of the steps outlined in steps S112 to S116 can be utilized in accordance with this exemplary embodiment to determine whether or not a packet is an important packet. For example, in step S112 a delta in the energy of one or more adjacent packets, or within a packet, is determined. In step S114, a plosive is detected. In step S116, the acoustic properties of a packet(s) can be analyzed as discussed above with these acoustic properties being correlatable to whether a packet should be identified as an important packet. Control then continues to step S120.

In step S120, a determination is made as to whether a packet has been identified as an important packet. If a packet has been identified as an important packet, control continues to step S130, with control otherwise jumping to step S140. As discussed, the determination as to whether a packet is an important packet is not limited to a yes or no, but can rather also be extended to the assigning of gradations of psycho-acoustic importance to the packet. For example, the system could determine the amount of energy delta within a packet and then assign a gradation of psycho-acoustic importance based on this delta. Another way would be the amount of inter-packet variation.

In step S130, the packet that was identified as important (or assigned an importance value corresponding to a particular gradation of importance) is retransmitted a number of times for redundancy with control then continuing to step S140. The number of times a packet is retransmitted with a specific psycho-acoustic value does not always have to be the same. For example, the techniques disclosed herein may normally send a packet with a specific psycho-acoustic value four times. But if the network is congested (or for one or more other reasons), it might make sense to send that packet two or three times instead of four, in order to ensure that the packet is not lost. This type of dynamic determination of the number of times a packet should be retransmitted can be based on any one or more of assigned importance value, network conditions, endpoint information, user information, channel conditions, or the like.

In step S140, a determination is made as to whether the conversation or communication session is over. If the conversation or communication session is not over, in step S150, control jumps back to step S120 for determination as to whether a subsequent packet is important. Otherwise, control continues to step S160 where the control sequence ends.

Figure 3:
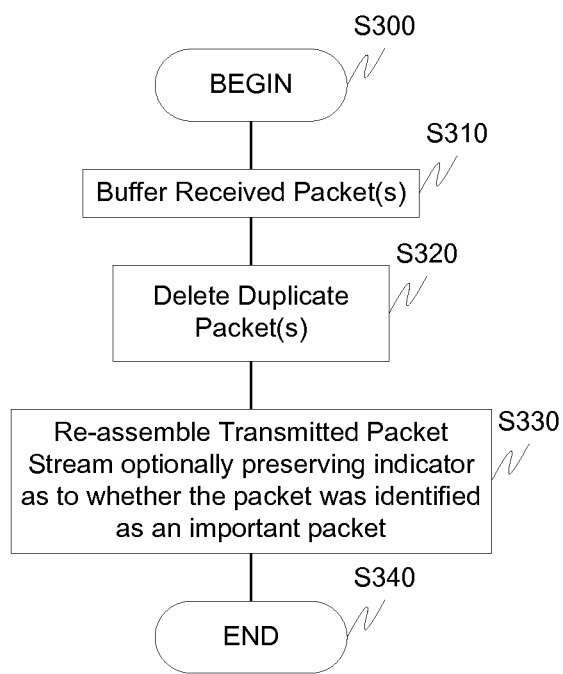
FIG. 3 is a flowchart illustrating an exemplary method for redundant packet reception according to an exemplary embodiment of this invention.

FIG. 3 outlines exemplary receiving endpoint functionality according to an exemplary embodiment. In particular, control begins in step S300 and continues to step S310. In step S310 the received packets are buffered or otherwise stored. A check can then optionally be run to delete duplicate packets in step S320. Then, in step S330, the packet stream transmitted from the transmitting endpoint is reassembled using well-known techniques to reconstruct the packet stream for playing to, for example, a user associated with the receiving endpoint. A buffer at the receiving endpoint can alleviate the effects of late packet arrival by buffering received voice packets. In most applications the buffer is a First-In-First-Out or FIFO buffer that stores voice codewords before playout and removes timing jitter from the incoming packet sequence. As will be appreciated, the buffer can dynamically increase and decrease in size as required to handle late packets when the network is uncongested while avoiding unnecessary delays when network traffic is congested.

An option, as discussed, can be the detection of information associated and transmitted with a packet, the information indicating that a packet is important. As discussed, this information can be utilized to trigger subsequent processing within the receiving endpoint to further enhance packets that are being identified as important. Control then continues to step S340 where the control sequence ends.

The various embodiments include components, methods, processes, systems and/or apparatus substantially as depicted and described herein, including various embodiments, subcombinations, and subsets thereof. Those of skill in the art will understand how to make and use the present invention after understanding the present disclosure. The disclosure, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description, for example, various features are grouped together in one or more embodiments for the purpose of streamlining the disclosure. This method of disclosure is not to be interpreted as reflecting an intention that the claimed subject matter requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as separate preferred embodiments.

Moreover, though the description of the invention has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

While the above-described flowcharts have been discussed in relation to a particular sequence of events, it should be appreciated that changes to this sequence can occur without materially affecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols described herein can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques disclosed herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a non-transitory storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for redundant transmission of important packets in a communication environment. While the embodiments have been described in conjunction with a number of features, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. A method for preserving communication packets that contribute disproportionately to voice quality and intelligibility comprising:
    determining a psycho-acoustic importance of a packet containing voice information to voice quality and intelligibility of the voice information;
    associating one of a plurality of identifiers with one or more packets that have been determined to have a high psycho-acoustic importance with respect to voice quality and intelligibility; and
    transmitting redundantly the one or more packets that have been determined to have a high psycho-acoustic important with respect to voice quality and intelligibility together with the associated identifier, wherein each of the one or more packets that have been determined to have a high psycho-acoustic important with respect voice quality and intelligibility are retransmitted a number of times.

2. The method of claim 1, further comprising detecting a delta in energy between adjacent packets.

3. The method of claim 1, further comprising detecting a delta in energy within the packet containing voice information.

4. The method of claim 1, further comprising detecting a plosive in a received speech stream or detecting a delta in spectral characteristics between adjacent packets.

5. The method of claim 1, further comprising performing an acoustic analysis on the packet containing voice information.

6. The method of claim 1, further comprising retransmitting the one or more packets that have a high psycho-acoustic importance with respect to voice quality and intelligibility multiple times.

7. The method of claim 1, further comprising determining the one of a plurality of identifiers that are associated with the one or more packets that have a high psycho-acoustic importance respect to voice quality and intelligibility.

8. The method of claim 1, wherein the communication packets are VOIP packets.

9. The method of claim 1, further comprising supporting multiple levels of transmission redundancy, with the levels of transmission redundancy dynamically varying based on a relative psycho-acoustic importance of each packet and a degree of network congestion.

10. A device comprising means for determining, means for associating and means for transmitting for performing the steps of claim 1.

11. A non-transitory computer-readable information storage media having stored thereon instructions, that if executed by a processor, cause to be performed the steps of claim 1.

12. A system that redundantly transmits communication packets that contribute disproportionately to voice quality and intelligibility comprising:
a packet importance determination module that determines a psycho-acoustic importance of a packet containing voice information to voice quality and intelligibility and associates one or more of a plurality of identifiers with one or more packets that have been determined to have a high psycho-acoustic important with respect to voice quality and intelligibility; and
a packet retransmission module and transceiver that transmit redundantly the one or more packets that have been determined to have a high psycho-acoustic importance with respect to voice quality and intelligibility, wherein each of the one or more packets that have been determined to have a high psycho-acoustic importance with respect to voice quality and intelligibility are retransmitted a number of times.

13. The system of claim 12, further comprising an energy detection module that detects a delta in energy between adjacent packets.

14. The system of claim 12, further comprising an energy detection module that detects a delta in energy within the packet containing voice information or detects a delta in spectral characteristics between adjacent packets.

15. The system of claim 12, further comprising an acoustic properties analysis module that detects a plosive in a received speech stream.

16. The system of claim 12, further comprising an acoustic properties analysis module that performs an acoustic analysis on the packet containing voice information.

17. The system of claim 12, further comprising a packet repetition module that retransmits the one or more packets that contribute disproportionately to voice quality and intelligibility multiple times.

18. The system of claim 12, wherein one or more of the plurality of identifiers are determined.

19. The system of claim 12, wherein the communication packets are VOIP packets.

20. The system of claim 12, wherein the system supports multiple levels of transmission redundancy, with the levels of transmission redundancy dynamically varying based on a relative psycho-acoustic importance of each packet and a degree of network congestion.

\* \* \* \* \*

UNITED STATES PATENT AND TRADEMARK OFFICE
CERTIFICATE OF CORRECTION

PATENT NO. : 8,976,675 B2  Page 1 of 1
APPLICATION NO. : 13/036903
DATED : March 10, 2015
INVENTOR(S) : Paul Roller Michaelis It is certified that error appears in the above-identified patent and that said Letters Patent is hereby corrected as shown below:

In the Claims

At Column 12, line(s) 40-41, please delete the word "important" and replace it with --importance-- therein.

At Column 12, line 44, please delete the word "important" and replace it with --importance-- therein.

At Column 12, line 65, please add the word "with" before --respect--.

At Column 13, line 19, please delete the word "important" and replace it with --importance-- therein.

Signed and Sealed this
Eighth Day of September, 2015

Michelle K. Lee
*Director of the United States Patent and Trademark Office*